(12) United States Patent
Howard et al.

(10) Patent No.: US 8,212,414 B2
(45) Date of Patent: Jul. 3, 2012

(54) RESONANT, CONTACTLESS RADIO FREQUENCY POWER COUPLING

(75) Inventors: Robert James Howard, Clifton, VA (US); John W. Rapp, Manassas, VA (US); Stanley Soonachan, Danville, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 424 days.

(21) Appl. No.: 12/474,376

(22) Filed: May 29, 2009

(65) Prior Publication Data

US 2010/0007214 A1  Jan. 14, 2010

Related U.S. Application Data

(60) Provisional application No. 61/079,666, filed on Jul. 10, 2008.

(51) Int. Cl.
*H01F 38/14* (2006.01)
*H01F 27/28* (2006.01)

(52) U.S. Cl. .......................................... 307/104

(58) Field of Classification Search ............ 307/104
See application file for complete search history.

(56) References Cited

U.S. PATENT DOCUMENTS

| | | | |
|---|---|---|---|
| 6,317,338 B1 * | 11/2001 | Boys ........................ | 363/25 |
| 7,385,357 B2 | 6/2008 | Kuennen et al. | |
| 7,667,352 B2 * | 2/2010 | Drechsler et al. ............ | 307/104 |
| 7,675,197 B2 * | 3/2010 | Tetlow ........................ | 307/104 |

* cited by examiner

*Primary Examiner* — Hal Kaplan
(74) *Attorney, Agent, or Firm* — DeMont & Breyer, LLC

(57) ABSTRACT

A resonant, contactless, RF power coupling suitable for high power-density applications and for use in an ocean environment is disclosed. In the illustrative embodiment, the power coupling includes a transmit coupling and a receive coupling, each of which include a resonant element. A high-powered RF generator is coupled to the transmit coupling and a rectifier circuit is coupled to the output coupling. Each of the resonant elements is disposed in its own electrically-conductive canister and advantageously potted in an appropriate insulating dielectric. Each canister has an open end to facilitate inductive coupling between the two resonant elements. In order to exclude seawater from the interface between the canisters, a seal of compliant material is disposed therebetween.

27 Claims, 7 Drawing Sheets

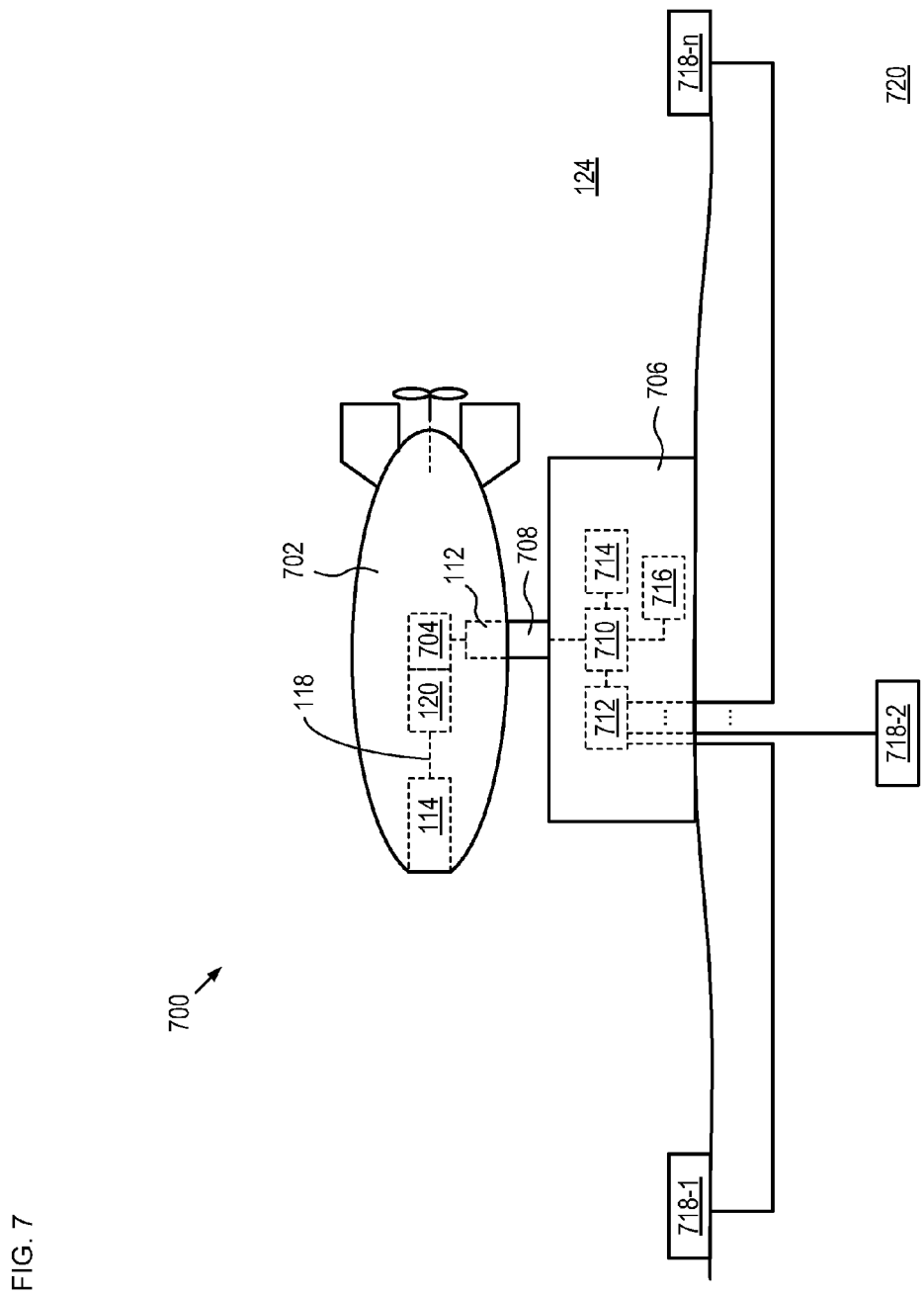

RESONANT, CONTACTLESS RADIO FREQUENCY POWER COUPLING

CROSS REFERENCE TO RELATED APPLICATIONS

This case claims priority to U.S. Provisional Patent Application Ser. No. 61/079,666, filed Jul. 10, 2008, which is incorporated by reference.

In addition, the underlying concepts, but not necessarily the language, of the following cases are incorporated by reference:

(1) U.S. patent application Ser. No. 12/396,349, filed Mar. 2, 2009; and
(2) U.S. patent application Ser. No. 12/411,824, filed Mar. 26, 2009.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to power transmission in general, and, more particularly, to contactless power transmission.

BACKGROUND OF THE INVENTION

Electrically powered vehicles are attractive in many application areas including civilian transport, military transport, long-life sensor platforms, undersea vehicles, airborne vehicles, and watercraft. In many cases, however, the operating time of these vehicles is short due to a drain on their storage systems by power intensive activities. As a result, their useful operating time is dictated by the ability to resupply them with electrical power. Electrical power can be supplied from either onboard power generation equipment or power transfer and storage of externally generated energy. On-board power generation is faced with many challenges, however. As a result, power transfer and storage systems are typically employed for most electrically powered vehicle systems.

In most cases, the capacity of the storage systems used to power these vehicles is limited; therefore, it is typically necessary to recharge these systems frequently. The time required to recharge an storage system can rival the operational time of the vehicle between charges. As a result, the use of electrically powered vehicles remains fairly limited. To further complicate matters, in many cases, the vehicle must be recharged without removing it from its environment, such as extended underwater sensor systems and Autonomous Undersea Vehicles (AUVs).

The transfer of externally generated electrical energy requires an ability to couple the external power source to an storage system on board the vehicle through a power coupling. Although underwater power couplings have been in use for a variety of underwater applications (e.g., oil industry, ships, submarines, towed arrays, etc.) for close to one hundred years, there are drawbacks to all known approaches.

Traditional contact-type power couplings (e.g., plug-and-socket connectors) suffer from a combination of complex connector geometries. Further, they are highly susceptible to corrosion when exposed to seawater. Although this type of coupling has been relied upon for many years, there is need for improvement in both the reliability of the power connection and its ease of use.

A variety of non-contact-type power couplings are known in the art, such as capacitive couplings, inductive couplings, radio frequency (RF) transformers, and resonant RF power couplings. Capacitive couplings generally suffer from relatively high impedance, which limits their power transfer efficiency. In addition, capacitive couplings require frequencies in excess of 100 megahertz to over a gigahertz to achieve kilowatt levels of power transfer.

Inductive (transformer) power couplings are more amenable to high power levels, but are based on very heavy core materials and require large amount of copper. As a result, inductive power couplings tend to be unwieldy and expensive to implement.

Radio Frequency (RF) transformers are much lighter than inductive couplings, but their transfer efficiency in a seawater environment is severely degraded by the conductivity of seawater itself.

Resonant RF power transfer has proven attractive for the transfer of electrical power over long distances. For example, resonant RF power transfer has been demonstrated to produce as high as 30 percent efficiency at multi-meter ranges in air. Unfortunately, the efficiency of resonant RF power transfer in seawater is also severely degraded by the conductivity of seawater. Further, the efficiency of prior-art resonant RF power coupling systems is reduced due to their reliance on open resonators, which radiate RF energy in many directions.

SUMMARY OF THE INVENTION

The invention provides a way to transfer externally generated electrical power to an storage system that avoids some of the costs and disadvantages of the prior art.

Embodiments of the present invention are suitable for rapidly charging storage systems, such as those used to store power for electrically powered vehicles including terrestrial vehicles, autonomous robotic systems, airborne or waterborne craft, such as AUVs, underwater vehicles, unmanned underwater vehicles (UUVs), unmanned aerial vehicles (UAVs), and the like.

The illustrative embodiment of the present invention is a resonant RF power coupling suitable for high power transfer applications. In the illustrative embodiment, the power coupling includes a transmit coupling and a receive coupling, each of which include a resonant element. A high-power RF generator is coupled to the transmit coupling and an storage system is coupled to the output coupling. In some embodiments, efficient transmission of power to an storage system within a vehicle submerged in seawater is enabled. Embodiments of the present invention overcome some of the inefficiencies typically associated with resonant power transfer in seawater.

RF power transfer in an ocean environment is complicated by the conductivity of seawater. In order to operate the resonant RF power coupling in an ocean environment, therefore, the RF energy must be shielded and isolated from the seawater. In the illustrative embodiment, this is accomplished by disposing each resonant circuit in a separate electrically conductive canister and potting the resonator in an appropriate insulating dielectric. Each canister has an open end to facilitate inductive coupling of the two resonant elements. In order to exclude seawater from the interface between the canisters, a seal of compliant material is disposed therebetween. When the canisters are aligned with one another and pressed together, the seal expresses sea water out of the region between the canisters.

In some embodiments, RF power is transferred between a pair of helical resonators with their open ends abutted. The helical resonators resonate at the operating frequency of the RF power transfer system, as well as at harmonics of this frequency. As a result, multiple frequencies of an RF signal are transmitted from the transmit coupling to the receive coupling, thereby enabling high-efficiency power transfer.

The inventive power coupling is relatively less sensitive to misalignment than prior art systems. Further, the present invention enables hermetic sealing of both the power source and a submerged instrumentation package. Embodiments of the invention are lighter and more robust than non-resonant, non-direct contact (no metal-to-metal contact) power coupling systems. Further, embodiments of the present invention have much higher power density than prior-art capacitive power coupling systems. A key advantage of embodiments of the present invention is the ability to avoid corrosion (galvanic and otherwise) and/or the complex and problematic seals that are required for use with direct-contact power coupling systems.

Although particularly well-suited for use in an ocean environment, resonant RF power couplings described herein can be used to advantage in any environment where contactless power transfer is desired. In particular, and among other benefits, embodiments of the invention: (1) enable rapid power transfer; and (2) enable improved isolation of power equipment from power spikes and transients, such as lightning and EMP bursts.

An embodiment of the present invention comprises: a transmit coupling, wherein the transmit coupling includes a first resonant circuit having a first resonant frequency; and a receive coupling, wherein the receive coupling includes a second resonant circuit having a second resonant frequency; wherein the transmit coupling receives an RF signal having a first frequency and a second frequency that is a harmonic frequency of the first frequency, and wherein the transmit coupling passes each of the first frequency and second frequency to the receive coupling when the transmit coupling and receive coupling are in a coupling relationship.

BRIEF DESCRIPTION OF THE DRAWINGS

FIG. 7 depicts a power transfer system in accordance with a first alternative embodiment of the present invention.

DETAILED DESCRIPTION

Figure 1:
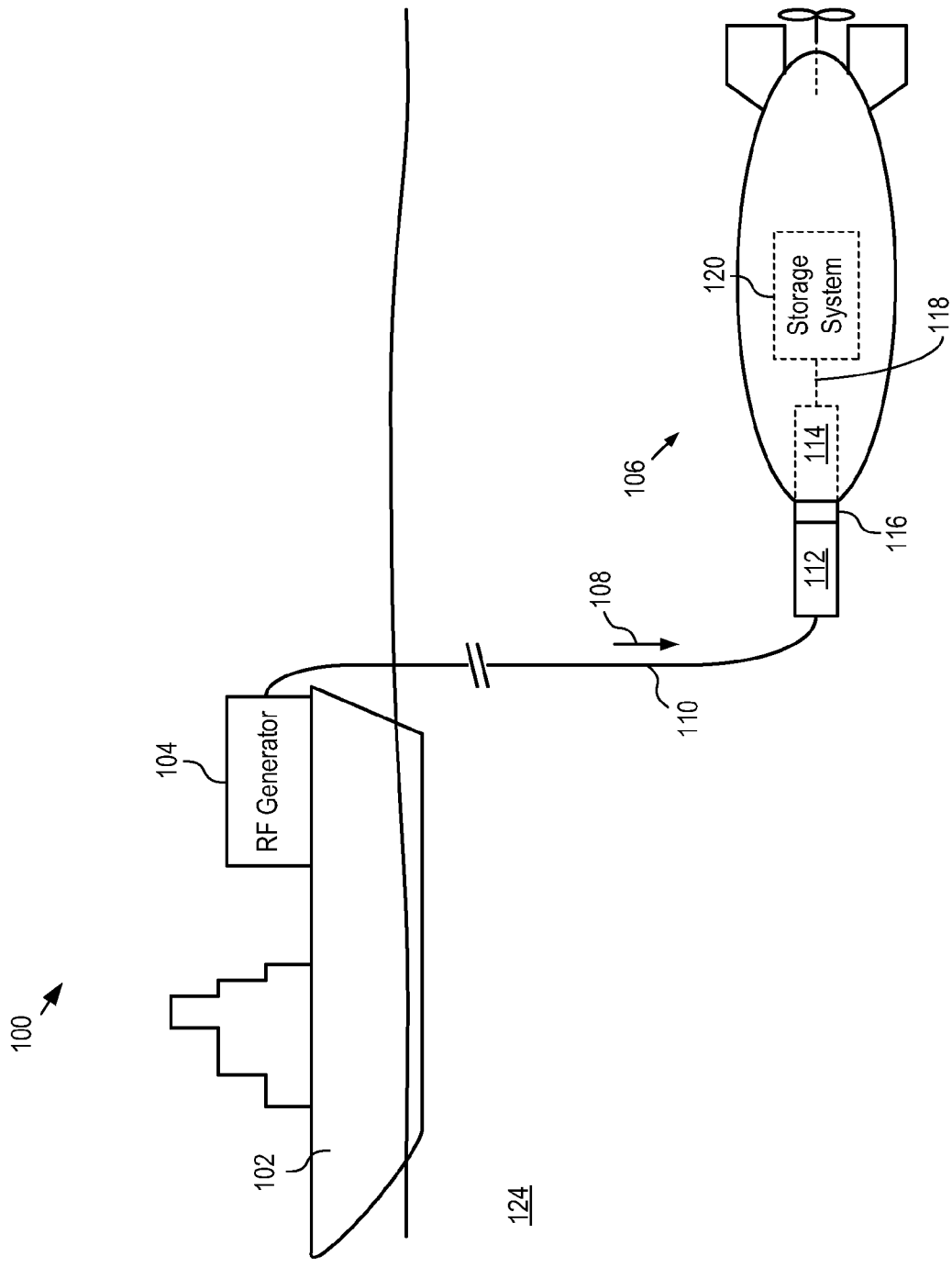
FIG. 1 depicts a schematic drawing of an RF power coupling system in accordance with an illustrative embodiment of the present invention.

FIG. 1 depicts a schematic drawing of an RF power coupling system in accordance with an illustrative embodiment of the present invention. System 100 enables rapid charging of an storage system included in an AUV while the AUV is submerged in a seawater environment. System 100 comprises RF generator 104, cable 110, transmit coupling 112, and receive coupling 114. Although the illustrative embodiment comprises an RF power coupling system that is configured for charging a submerged AUV, it will be clear to one skilled in the art, after reading this specification, how to specify, make, and use alternative embodiments of the present invention that are suitable for charging battery-powered land-based vehicles, surface-based nautical vessels, and aircraft.

RF generator 104 is mounted on ship 102, which is located at the surface of ocean 124. RF generator 104 is an RF generation system capable of generating hundreds of kilowatts (kW) of RF power at a frequency of 30 MHz. RF generator 104 generates RF signal 108, which is conveyed to transmit coupling 112 on cable 110. In some embodiments, RF generation system is located on a floating or fixed-position deep-sea platform, such as a tension-leg platform, floating platform, or moored platform. In some embodiments, the RF generation system is located in a terrestrial system, such as a port facility.

AUV 106 is an unmanned submarine that comprises receive coupling 114 and storage system 120. Storage system 120 comprises a conventional battery-based storage system and signal conditioning apparatus (i.e., bridge rectifiers, etc.) for converting RF signal 108 into electrical energy suitable for charging the batteries. In some embodiments, storage system 120 comprises alternative energy storage systems other than, or in addition to, batteries. Systems suitable for use in storage system 120 include, without limitation, fuel cells, ultracapacitors, flow batteries, and the like. In some embodiments, energy storage system 120 stores energy in a form other than electrical energy, such as mechanical, thermal, magnetic, chemical, etc. It will be clear to one skilled in the art, after reading this specification, how to specify, make, and use AUV 106 and storage system 120.

Figure 2:
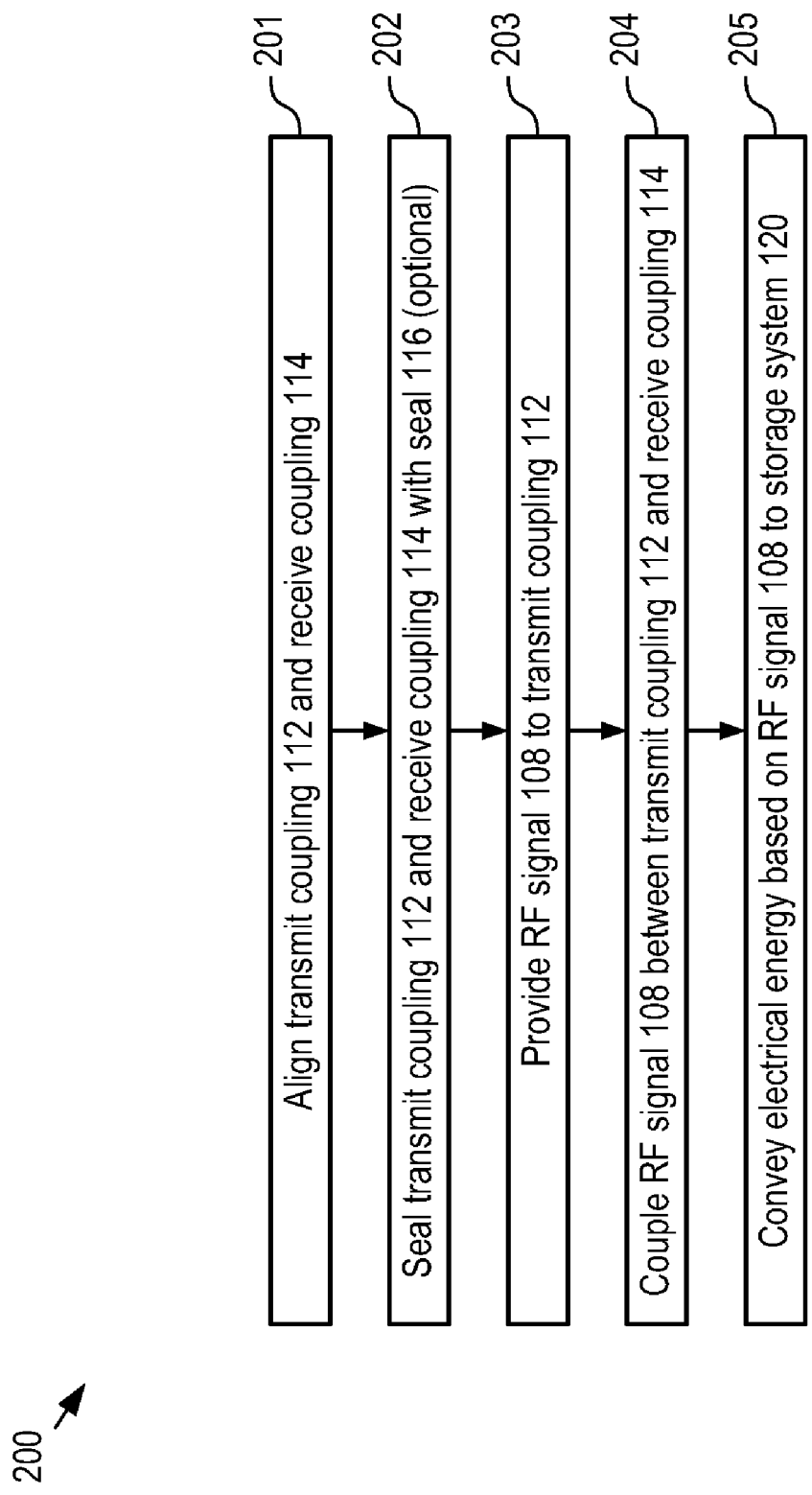
FIG. 2 depicts operations of a method for providing power to an AUV in accordance with the illustrative embodiment of the present invention.

FIG. 2 depicts operations of a method for providing power to an AUV in accordance with the illustrative embodiment of the present invention. Method 200 begins with operation 201, wherein transmit coupling 112 and receive coupling 114 are aligned to enable efficient power transfer through system 100.

When transmit coupling 112 and receive coupling 114 are suitably aligned, the input impedance of the power coupling system is substantially matched to the impedance of RF generator 104. As a result, power can be transferred through the mated couplings with little or no back-reflection or scattered energy.

When transmit coupling 112 and receive coupling 114 are misaligned, the input impedance of the power coupling system is substantially different than the impedance of RF generator 104. In some embodiments, system 100 comprises a back impedance detection system to detect proper alignment of transmit coupling 112 and receive coupling 114. In some embodiments, system 100 detects RF power that is reflected from transmit coupling 112 and uses this detected power to indicate proper coupling alignment. Since impedance detection can be done at low energies, such detection schemes do not significantly degrade the overall efficiency of the power transfer system.

Figure 3:
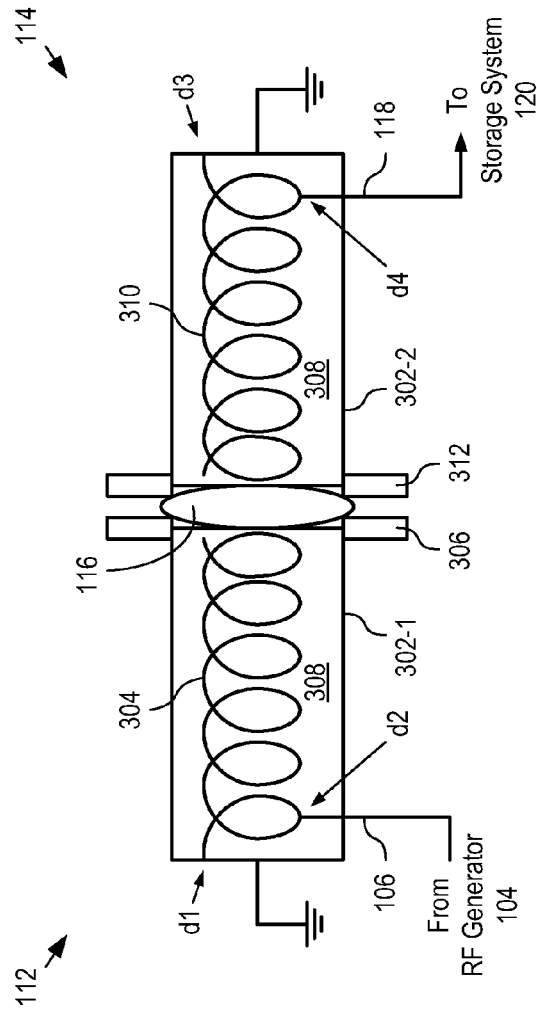
FIG. 3 depicts transmit coupling 112 mated with receive coupling 114.

FIG. 3 depicts transmit coupling 112 mated with receive coupling 114. FIG. 3 is described with continuing reference to FIGS. 1 and 2.

Transmit coupling comprises canister 302-1, resonator 304, and flange 306. Canister 302-1 is an electrically conductive canister having a diameter of approximately five inches and one open end. Canister 302-1 is electrically connected to ground potential and acts as an RF shield for resonator 304. Canister 302-1 also isolates resonator 304 from the effects of seawater.

Receive coupling comprises canister 302-2, resonator 310, and flange 312. Canister 302-2 is analogous to canister 302-1. In similar fashion to canister 302-1, canister 302-2 acts as an RF shield for resonator 310 and isolates it from the effects of seawater.

Resonator 304 is a helical resonator having a resonant frequency of 30 MHz. Resonator 304 has a length of approximately seven inches and has 15 turns of fine, multi-stranded, individually insulated wire. One end of resonator 304 is electrically connected to canister 302-1 at point d1. The other end of resonator 304 is open to the open end of canister 302-1. RF generator 104 is electrically connected to resonator 304 at point d2.

Transmit coupling 112 is characterized by an input impedance of approximately 700 Ohms and a quality factor (Q) of approximately 1500. In some embodiments, impedance matching is provided to facilitate power transfer between transmit coupling 112 and the external circuitry to which it is electrically connected (i.e., RF generator 104). In some embodiments, this impedance matching is provided by forming point d2 within approximately 1.25 turns from point d1.

Resonator 310 is also a helical resonator having a resonant frequency of 30 MHz. In some embodiments, the resonant frequencies of resonators 304 and 310 are matched to facilitate power transfer between transmit coupling 112 and receive coupling 114. Resonator 310 has a length of approximately seven inches 15 turns of fine, multi-stranded, individually insulated wire. One end of resonator 310 is electrically connected to canister 302-2 at point d3. The other end of resonator 310 is open to the open end of canister 302-2. Storage system 120 is electrically connected to resonator 310 at point d4.

Receive coupling 114 is characterized by an impedance of approximately 700 Ohms and a Q of approximately 1500. In some embodiments, point d4 is formed within approximately 1.25 turns from point d3 to facilitate impedance matching between receive coupling 114 and storage system 120. In some embodiments, impedance matching devices, as are well known in the art, are used to improve power transfer between transmit coupling 112 and receive coupling 114 and reduce standing wave ratios.

In some embodiments, the resonant frequency of at least one of resonators 304 and 310 is tuned. This can be accomplished using tuning devices, as are well known in the art. Typical tuning devices for resonant circuits include varactors, variable inductors, or variable capacitors. Automatic tuning circuits are also known in the art. They are particularly useful since environmental variations, coupler alignment, and the like can affect the precise resonant frequencies of the couplers. Loading of the couplers will reduce the effective Q of the circuits and thus broaden the resonance. This simplifies the process of matching the frequencies of the two halves of the RF coupler.

Although the illustrative embodiment comprises resonators that are helical resonators, it will be clear to one skilled in the art, after reading this specification, how to specify, make, and use alternative embodiments of the present invention that comprise a resonator that is other than a helical resonator. Resonators suitable for use in the present invention include, without limitation, helical resonators, inductor-capacitor (LC) circuits, tunable resonators, and the like.

Resonators 304 and 310 are potted within canisters 302-1 and 302-2, respectively, by dielectric 308. Dielectric 308 is an insulating dielectric compound suitable for use as a potting compound for the resonators. It will be clear to one skilled in the art how to specify, make, and use dielectric 308.

Flanges 306 and 312 collectively form a mating system that physically connect transmit coupling 112 and receive coupling 114. Flanges 306 and 312 substantially align resonators 304 and 310, as well as bring the open ends of the resonators into close proximity with one another, which facilitates inductive coupling between the resonators.

At optional operation 202, transmit coupling 112 and receive coupling 114 are sealed by mating flanges 306 and 312. While mating flanges 306 and 312, transmit coupling 112 and receive coupling 114 are drawn toward one another. This reduces the gap between the resonators and enables each canister to form a substantially watertight seal with seal 116.

One skilled in the art will recognize that seawater located between the resonators will reduce the efficiency with which RF signal 108 couples between resonators 304 and 310. To mitigate the effects of seawater between the resonators, therefore, seal 116 comprises a shape that enhances the expression of seawater from the region between resonators 304 and 310. As transmit coupling 112 and receive coupling 114 are drawn toward one another, seal 116 is compressed and expresses seawater out of this region.

Seal 116 is formed of a compliant material and has a shape that is similar to that of a convex lens, wherein it is relatively wider near its midpoint and narrower at its ends. As a result, as transmit coupling 112 and receive coupling 114 are drawn toward one another, the midpoint of seal 116 is pressed against the exposed faces of dielectric 308. As canisters 302-1 and 302-2 are drawn further toward one another, the contact area between seal 116 and dielectrics 308 expands forcing seawater away from the center of the exposed surface of the dielectric. In addition to improving the efficiency of the transfer of power from transmit coupling 112 to receive coupling 114, the removal of seawater from the coupling system reduces or eliminates corrosion (e.g., galvanic, etc.) that degrades the lifetime and reliability of prior-art contact-type power coupling systems.

One skilled in the art will recognize that once the couplings are mated, any thin layer of seawater that remains between the exposed faces of transmit coupling 112 and receive coupling 114 is vaporized during the RF power transfer process. Further, it will be clear that the design of seal 116 is application dependent and that in some applications seal 116 is unnecessary.

One skilled in the art will also recognize that the specific designs of transmit coupling 112 and receive coupling 114 are highly dependent on a number of factors, such as application, cable lengths, environment, and operating frequency, among others. It will be clear to one skilled in the art, therefore, after reading this specification, how to make and use alternative embodiments of the present invention that:
  i. operate at frequencies other than 30 MHz; or
  ii. comprise a different RF shield or a shield of different dimensions; or
  iii. comprise a resonator other than a helical resonator; or
  iv. comprise a helical resonator other than resonators 304 and 310 (e.g., different length, number of windings, different wire diameter, etc.); or
are characterized by any combination of i, ii, iii and iv.

It is an aspect of the present invention that transmit coupling 112 and receive coupling 114 enable the transmission of the fundamental frequency of RF signal 108 as well as harmonic frequencies of the fundamental frequency. The present invention derives this advantage over the prior art through the use of resonators that are resonant at each of these frequencies.

It should be noted that when transmit coupling 112 and receive coupling 114 are mated, canisters 302-1 and 302-2 form a substantially continuous electrical shield around resonators 304 and 310. As a result, the present invention enables a power coupling system that substantially isolates the power generation equipment and storage system from power spikes such as those caused by lightning strikes or electromagnetic pulse attacks.

Figure 4:
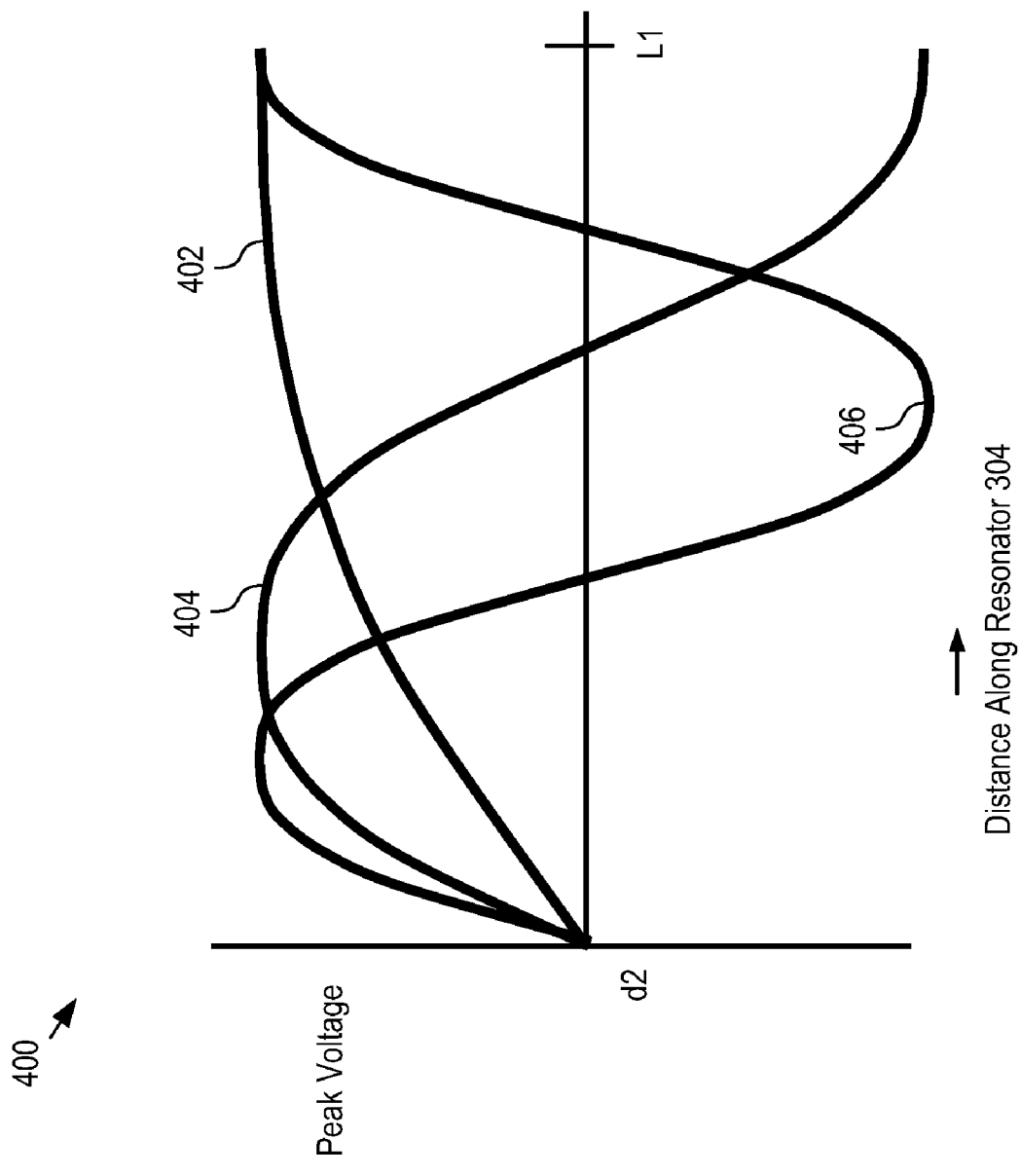
FIG. 4 depicts a plot of RF signal 108.

FIG. 4 depicts a plot of RF signal 108. Plot 400 depicts fundamental frequency 402, first even harmonic frequency 404 and first odd harmonic frequency 406. As evinced by plot 400, the amplitude of RF signal 108 is substantially at a maximum for both fundamental frequency 402 and first odd harmonic frequency 406 at the free end, L1, of resonator 304. As a result, resonator 304 resonates for both of frequencies 402 and 406 and substantially all the RF power associated with them is passed from resonator 304 to resonator 310. The efficiency of RF power transfer for embodiments of the present invention, therefore, can be much higher than RF power transfer systems of the prior art. This improved efficiency affords several advantages for the present invention over prior-art systems, including:

i. reduced sensitivity to misalignment; or
ii. operation at higher power levels; or
iii. reduced charging time; or
iv. reduced heating and component degradation due to power transfer inefficiency; or
v. reduced galvanic corrosion; or
vi. any combination of i, ii, iii, iv, and v.

At operation 203, RF generator 104 provides RF signal 108 to transmit coupling 112 on cable 110.

Figure 5:
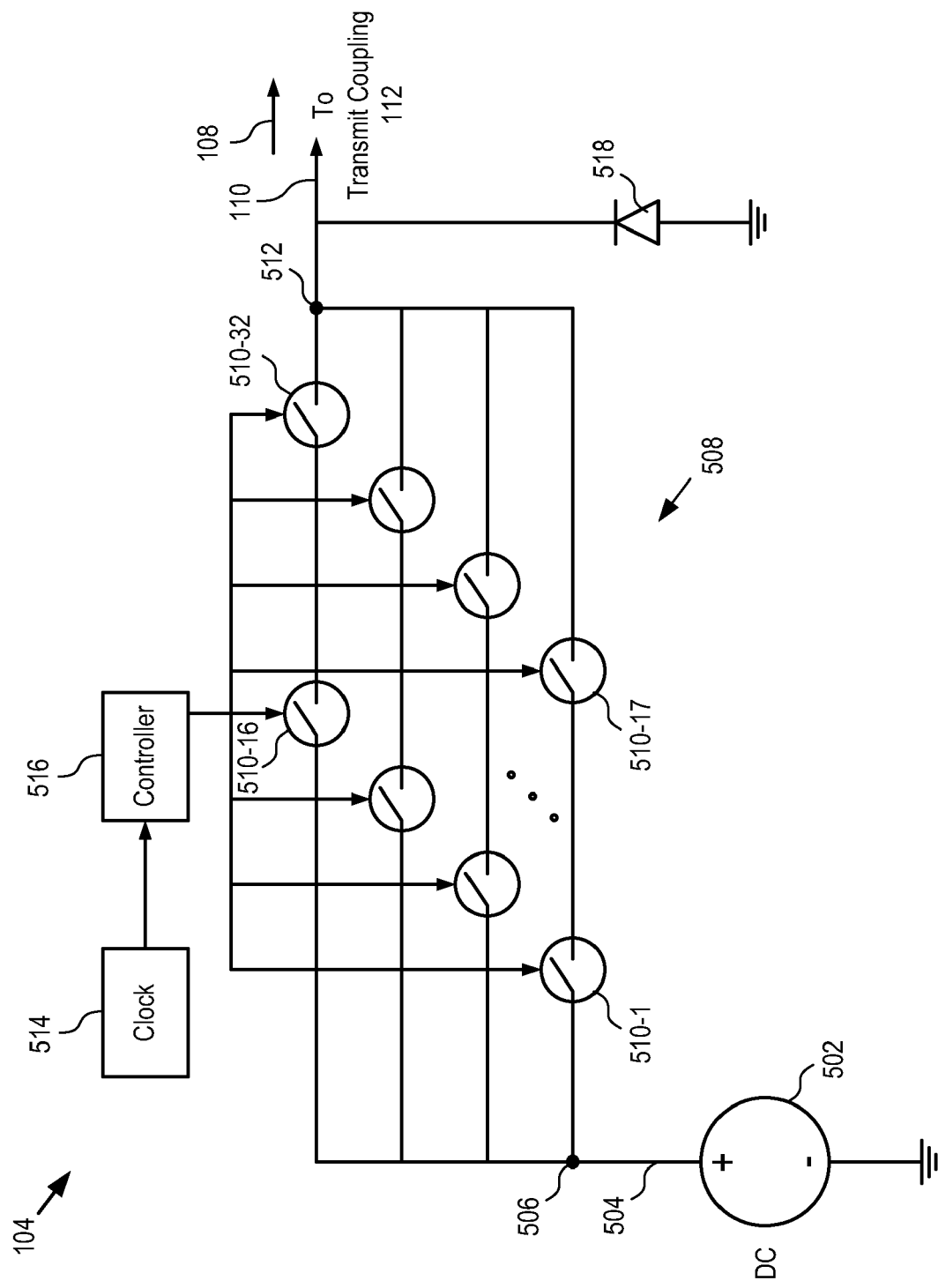
FIG. 5 depicts a schematic drawing of an RF generator in accordance with the illustrative embodiment of the present invention.

FIG. 5 depicts a schematic drawing of an RF generator in accordance with the illustrative embodiment of the present invention. RF generator 104 comprises power supply 502, switch bank 508, clock 514, controller 516, and diode 518.

Figure 6:
FIG. 6 depicts sub-operations of a sub-method suitable for providing an RF signal.

FIG. 6 depicts sub-operations of a sub-method suitable for providing an RF signal. Sub-method 600 is suitable for use in operation 203 of method 200. Sub-method 600 begins with sub-operation 601, wherein power supply 502 provides a constant voltage signal on cable 504.

Cable 504 is electrically connected to input node 506 of switch bank 508. Switch bank 508 comprises switches 510-1 through 510-32 (collectively referred to as switches 510), each of which is operates as a 2 MHz chopper. Switches 510 are interconnected as pairs of choppers that are electrically connected in series. Each switch pair is electrically connected with the remaining switch pairs in parallel between input node 506 and output node 512.

At operation 602, clock 514 and controller 516 collectively provide control signals to switch bank 508 to sequence the opening and closing of switches 510. As a result of this sequencing of switches 510, a square wave of frequency 30 MHz (i.e., RF signal 108) appears at output node 512. Transmit coupling 112 is electrically connected to output node 512 (and diode 518); therefore, transmit coupling 112 receives RF signal 108.

Although the illustrative embodiment comprises an RF generator that is a chopper-based, switched-mode power supply, it will be clear to one skilled in the art, after reading this specification, how to specify, make, and use alternative embodiments of the present invention that comprise a different type of RF generator, such as a class "D" power supply, a digital oscillator, an analog oscillator and linear amplifier, an analog oscillator without a linear amplifier, a non-linear analog oscillator, and the like.

At operation 204, RF signal 108 is coupled between transmit coupling 112 and receive coupling 114.

At operation 205, electrical energy based on RF signal 108 is conveyed to storage system 120 on power cable 118.

FIG. 7 depicts a power transfer system in accordance with a first alternative embodiment of the present invention. System 700 comprises AUV 702 and power node 706. AUV 702 is depicted as coupled with power node 706, which is located on sea floor 720.

In many cases, remote devices, such as remote sensors, AUVs, and the like, can be difficult to access for direct power transfer from an external source. An energy transport vehicle, such as AUV 702, enables such devices to be recharged more easily.

AUV 702 comprises receive coupling 114, storage system 120, RF generator 704, and transmit coupling 112. AUV 702 is an underwater vehicle that is capable of transporting electrical energy between an external source (e.g., ship 102) and a remote power node.

RF generator 704 is analogous to RF generator 104.

Power node 706 is a remote hub for providing power to a plurality of remote devices, such as remote sensors, AUVs, and the like. Power node 706 comprises coupling 708, switch 710, storage system 712, impedance detector 714, and RF generator 716. Power node 706 is capable of receiving power at coupling 708 from an energy transport vehicle, as shown. Alternatively, power node 706 can be reconfigured so that it can provide power at coupling 708 (e.g., to an energy transport vehicle, AUV, etc.).

Coupling 708 is analogous to receive coupling 114; however, one skilled in the art will recognize, after reading this specification, that a receive coupling can act as a transmit coupling to transmit an RF signal to another coupling when the coupling is properly configured.

Switch 710 is a three-way switch that enables coupling 708 to be selectively interconnected with storage system 712, impedance detector 714, or RF generator 716.

Storage system 712 is analogous to storage system 120, and comprises signal conditioning circuitry, a controller for managing interconnectivity between storage system 712, other power nodes, and remote sensors 718-1 throucih 718-n.

Impedance detector 714 is a conventional low-power impedance detector. When interconnected to coupling 708 through switch 710, impedance detector 714 detects when a vehicle has properly mated to coupling 708.

RF generator 716 is analogous to RF generator 104.

Remote sensors 718-1 through 718-n are sensors for detecting seismic activity, sonar signals, temperature, pressure, and the like.

In order to transfer electrical energy from AUV 702 to storage system 712, storage system 120 is recharged as described above and with respect to FIGS. 1-6. Once storage system 120 has stored a desired amount of electrical energy, AUV 702 travels to the location of power node 706. In anticipation of receiving electrical power, switch 710 interconnects impedance detector 714 and coupling 708. Once proper alignment of transmit coupling 112 and coupling 708 is detected, switch 710 disengages impedance detector 714 and connects storage system 712 and coupling 708. In some embodiments, it is not necessary to disconnect impedance detector 714 prior to transferring power through coupling 708. Once the couplings are aligned, RF generator 704 provides an RF signal to transmit coupling 112, in analogous fashion to operation 203. This RF signal is coupled into storage system 712 through coupling 708. Storage system 712 conditions the RF signal, thereby providing electrical energy for charging its storage batteries. This stored electrical energy can then used to power remote sensors 718-1 through 718-n.

Alternatively, power node 706 can be configured to provide electrical energy to an AUV or other vehicle. In order to provide electrical energy at coupling 708, switch 710 connects coupling 708 and RF generator 716. Once coupling 708 is suitably connected with the receive coupling of an AUV, an RF signal is transmitted between coupling 708 and the receive coupling of the AUV. Although not depicted in FIG. 7, RF generator 716 derives its energy from storage system 712. In some embodiments, power node 706 is a self-contained power generation system that does not require periodic recharging by an AUV or other vehicle. Examples of standalone power generation systems suitable for use in power node 706 include, without limitation, energy scavenging systems and geo-thermal energy conversion systems, such as those described in U.S. patent application Ser. No. 12/396,349, filed Mar. 2, 2009, and U.S. patent application Ser. No. 12/411,824, filed Mar. 26, 2009, each of which is incorporated herein by reference.

It should be noted that the number of remote sensors to which power node 706 is interconnected is limited only by the capacity of storage system 712 and the rate at which the storage system can be recharged. Further, it will be clear to one skilled in the art, after reading this specification, that a plurality of power nodes 706 can be interconnected to provide multiple storage systems from which any of the plurality of remote sensors can draw energy. Each of these power nodes also provides an access point at which electrical energy can be received or provided.

Although the alternative embodiment depicts an AUV comprising a separate transmit and receive coupling, it will be clear to one skilled in the art, after reading this specification, that a switched system, such as that included in power node 706, is also suitable for use in an AUV or other vehicle.

Figure 8:
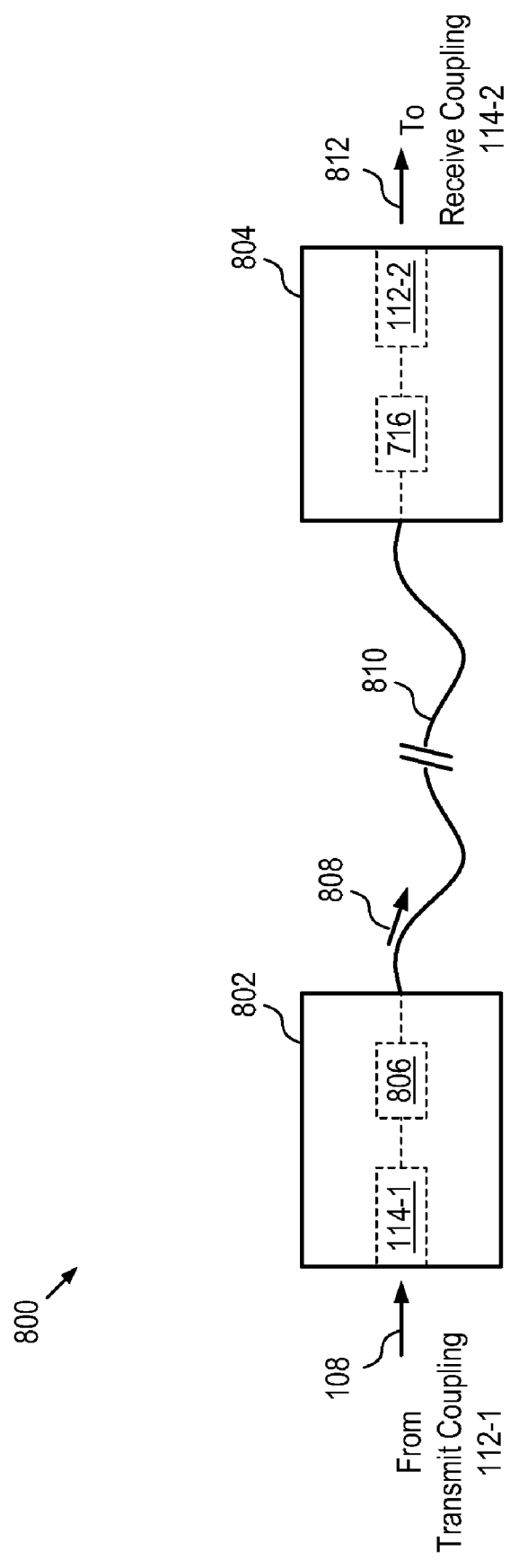
FIG. 8 depicts a power transfer cable in accordance with a second alternative embodiment of the present invention.

FIG. 8 depicts a power transfer cable in accordance with a second alternative embodiment of the present invention. Cable 800 comprises receiver 802 and transmitter 804. Cable 800 is analogous to an electrical extension cord or optical fiber jumper cable. Cable 800 enables the transfer of electrical energy to a remote location. Cable 800 receives RF energy at a receiving end, converts it to a DC signal, and transmits it along an electrically conductive cable to a transmitting end. In some embodiments, cable 800 enables more efficient transfer of electrical energy through a medium that would significantly attenuate an RF signal, such as salt water.

Receiver 802 comprises receive coupling 114-1 and rectifier 806. Receive coupling 114-1 receives RF signal 108 from a transmit coupling 112-1 and passes it to rectifier 806. Rectifier 806 converts the RF signal into DC signal 808 on DC cable 810.

Transmitter 804 comprises RF generator 716 and transmit coupling 112-2. Transmitter 804 receives DC signal 808 at RF generator 716, which converts the DC signal into RF signal 812. In some embodiments, RF signal 812 is substantially identical to RF signal 108. Transmit coupling 112-2 transmits RF signal 812 to a receive coupling 114-2, when these couplings are mated.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A contactless RF power coupling system comprising:
   a transmit coupling, wherein the transmit coupling includes a first canister that is electrically conductive and at least partially open at an end thereof, and a first resonant circuit having a first resonant frequency;
   a receive coupling, wherein the receive coupling includes a second canister that is electrically conductive and at least partially open at an end thereof, and a second resonant circuit having a second resonant frequency; and
   an RF source that provides the RF signal to the transmit couplings, the RF source comprising:
      a direct current power supply;
      a plurality of switches, wherein each of the plurality of switches comprises a first contact and a second contact, and wherein each of the plurality of first contacts and the power supply are electrically connected at a first node, and wherein each of the plurality of second contacts and the first resonant circuit are electrically connected at a second node; and
      a controller, wherein the controller controls the state of each of the plurality of switches;
   wherein the transmit coupling receives an RF signal having a first frequency and a second frequency that is a harmonic frequency of the first frequency, and wherein the transmit coupling passes each of the first frequency and second frequency to the receive coupling when the transmit coupling and receive coupling are inductively coupled.

2. The RF power coupling system of claim 1 wherein the first resonant frequency and the second resonant frequency are equal.

3. The RF power coupling system of claim 1 wherein at least one of the first resonant frequency and second resonant frequency is tunable.

4. The RF power coupling system of claim 1 further comprising a seal, wherein the first canister has a first end that is open and the second canister has a second end that is open, and wherein the first canister couples with the second canister such that the first end and second end are opposed, and wherein the seal is interposed between the first end and second end, and further wherein the seal:
   (a) comprises a compliant material; and
   (b) is shaped to force fluid out of the first canister and the second canister.

5. The RF power coupling system of claim 4 wherein the seal has a shape that is relatively wider near a midpoint thereof and relatively narrower near an end thereof.

6. The RF power coupling system of claim 4 wherein the seal has the shape of a biconvex lens.

7. A method for contactless coupling of RF power to a storage system, wherein the method comprises:
   providing an RF signal to a first coupling, wherein the first coupling comprises a first resonant circuit having a first resonant frequency, and wherein the RF signal comprises a first frequency and a second frequency that is a harmonic frequency of the first frequency;
   locating a second coupling at a first distance from the first coupling, wherein the second coupling comprises a second resonant circuit having a second resonant frequency, and wherein the first distance enables inductive coupling of the RF signal between the first coupling and the second coupling;
   forming a seal between the first coupling and the second coupling, wherein the seal is formed by compressing a compliant member between the first coupling and the second coupling, wherein the compliant member has a shape that is relatively wider near a midpoint thereof and relatively narrower near an end thereof, and wherein the compression of the compliant member forces fluid out of at least one of the first coupling and the second coupling; and coupling the RF signal between the first coupling and the second coupling, wherein the coupled RF signal contains each of the first frequency and the second frequency.

8. The method of claim 7 further comprising conveying electrical energy based on the RF signal from the second coupling to a storage system.

9. The method of claim 7 further comprising generating the RF signal, wherein the RF signal is generated by operations comprising:
providing a direct current electrical signal to a switch bank having an input and an output, wherein the switch bank comprises a plurality of switches that are electrically connected in parallel, and wherein the output and the first coupling are electrically connected; and
controlling the position of each of the switches.

10. The method of claim 7 further comprising controlling at least one of the first resonant frequency and the second resonant frequency.

11. The method of claim 7 further comprising monitoring an impedance of the first coupling.

12. A contactless, RF power coupling system comprising:
a transmit coupling, wherein the transmit coupling includes:
  (a) a first canister that is electrically conductive and at least partially open at an end thereof; and
  (b) a first resonant circuit disposed in the first canister;
a receive coupling, wherein the receive coupling includes:
  (a) a second canister that is electrically conductive and at least partially open at an end thereof; and
  (b) a second resonant circuit disposed in the second canister, wherein, the first and second canister are disposed with respect to one another so that the partially open end of each of the first and second canisters are in opposed relation; and
an RF source, wherein the RF source and the transmit coupling are electrically connected, and wherein the RF source provides an RF signal that comprises a first frequency and a second frequency that is a harmonic frequency of the first frequency;
wherein the transmit coupling passes each of the first frequency and second frequency to the receive coupling when the transmit coupling and receive coupling are inductively coupled.

13. The RF power coupling system of claim 12 wherein the second frequency is an odd harmonic of the first frequency.

14. The RF power coupling system of claim 12 further comprising a seal, wherein the seal is interposed between the opposed partially open ends of the first and second canister, and further wherein the seal:
(a) comprises a compliant material; and
(b) is shaped to force water out of the first canister and the second canister.

15. The RF power coupling of claim 14 wherein the seal forms a watertight seal for each of the transmit coupling and receive coupling when compressed between the transmit coupling and the receive coupling.

16. The RF power coupling of claim 14 wherein the seal has the shape of a biconvex lens.

17. The RF power coupling of claim 12 wherein the first resonant circuit comprises a helical resonator.

18. The RF power coupling of claim 12 wherein the transmit coupling and receive coupling are detachably mountable to one another, and wherein when the transmit coupling and receive coupling are mounted to one another:
(a) the transmit coupling and receive coupling are disposed with respect to one another so that the RF signal is coupled between the first resonant circuit and the second resonant circuit; and
(b) the first resonant circuit and the second resonant circuit are separated by less than 6 inches.

19. A power transfer system comprising:
a first coupling, wherein the first coupling includes a first resonant circuit having a first resonant frequency;
a second coupling, wherein the second coupling includes a second resonant circuit having a second resonant frequency;
a first storage system, wherein the first storage system stores electrical energy that is based on a first signal received from the second coupling; and
a seal, wherein the seal is interposed between a first canister of the first coupling and a second canister of the second coupling, and wherein the seal comprises a compliant material and is shaped to force water out of the first canister and the second canister;
wherein the first coupling receives a first RF signal having a first frequency and a second frequency that is a harmonic frequency of the first frequency, and wherein the first coupling passes each of the first frequency and second frequency to the second coupling when the first coupling and second coupling are inductively coupled; and
wherein the first storage system stores electrical energy that is based on the first signal, and further wherein the first signal is based on the first RF signal.

20. The power transfer system of claim 19 further comprising:
an RF generator; and
a third coupling that has a third resonant circuit having a third resonant frequency;
wherein the RF generator generates a second RF signal having a third frequency, and wherein the second coupling passes the third frequency to the third coupling when the second coupling and third coupling are inductively coupled.

21. The power transfer system of claim 20 further comprising a vehicle, wherein the vehicle comprises the second coupling, the first storage system, and the third coupling.

22. The power transfer system of claim 20 wherein the second RF signal further comprises a fourth frequency that is a harmonic of the third frequency, and wherein the second coupling passes the fourth frequency to the third coupling when the second coupling and third coupling are inductively coupled.

23. The power transfer system of claim 22 wherein the fourth frequency is an odd harmonic of the third frequency.

24. The power transfer system of claim 19 wherein the seal forms a substantially watertight seal for each of the third coupling and fourth coupling when compressed between the third coupling and the fourth coupling.

25. A power transfer system comprising:
a first coupling, wherein the first coupling includes a first resonant circuit having a first resonant frequency;
a second coupling, wherein the second coupling includes a second resonant circuit having a second resonant frequency;
a first storage system;
an RF generator; and
a switch, wherein the switch has a first position and a second position, and wherein the second coupling and the storage system are electrically connected when the switch is in the first position, and wherein the second coupling and the RF generator are electrically connected when the switch is in the second position wherein the first coupling passes each of a first frequency and a second frequency of a first RF signal to the second coupling when the first coupling and second coupling are inductively coupled and the switch is in the first position, and wherein the second frequency is a harmonic of the first frequency; and wherein the second coupling passes each of a third frequency and a fourth frequency of a second RF signal to the first coupling when the first coupling and second coupling are inductively coupled and the switch is in the second position, and wherein the fourth frequency is a harmonic of the third frequency.

26. The power transfer system of claim 25 further comprising an impedance detector, wherein the switch has a third position, and wherein the second coupling and the impedance detector are electrically connected with the switch is in the third position.

27. A power transfer system comprising:
a first coupling, wherein the first coupling includes a first resonant circuit having a first resonant frequency;
a second coupling, wherein the second coupling includes a second resonant circuit having a second resonant frequency;
a third coupling, wherein the third coupling includes a third resonant circuit having a third resonant frequency;
a fourth coupling, wherein the fourth coupling includes a fourth resonant circuit having a fourth resonant frequency;
a rectifier; and
an RF generator;
wherein the first coupling passes each of a first frequency and a second frequency of a first RF signal to the second coupling when the first coupling and second coupling are inductively coupled;
wherein the rectifier receives the first RF signal from the second coupling and converts the first RF signal into a first DC signal;
wherein the RF generator receives the first DC signal and converts it into a second RF signal; and
wherein the third coupling receives the second RF signal from the RF generator.

* * * * *